US009661482B2

(12) United States Patent
Takahashi et al.

(10) Patent No.: US 9,661,482 B2
(45) Date of Patent: May 23, 2017

(54) MOBILE COMMUNICATION METHOD, RADIO BASE STATION AND MOBILITY MANAGEMENT NODE

(71) Applicant: NTT DOCOMO, INC., Tokyo (JP)

(72) Inventors: Hideaki Takahashi, Tokyo (JP); Wuri Andarmawanti Hapsari, Tokyo (JP); Sadayuki Abeta, Tokyo (JP); Kenichiro Aoyagi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/400,974

(22) PCT Filed: May 14, 2013

(86) PCT No.: PCT/JP2013/063388
§ 371 (c)(1),
(2) Date: Nov. 13, 2014

(87) PCT Pub. No.: WO2013/172332
PCT Pub. Date: Nov. 21, 2013

(65) Prior Publication Data
US 2015/0105039 A1    Apr. 16, 2015

(30) Foreign Application Priority Data
May 14, 2012    (JP) .................... 2012-110900

(51) Int. Cl.
*H04W 4/22*    (2009.01)
*H04W 52/02*    (2009.01)
(Continued)

(52) U.S. Cl.
CPC ......... *H04W 4/22* (2013.01); *H04W 52/0216* (2013.01); *H04W 52/0235* (2013.01);
(Continued)

(58) Field of Classification Search
CPC ............. H04W 52/0225; H04W 60/06; H04W 76/022; H04W 4/22
See application file for complete search history.

(56) References Cited

U.S. PATENT DOCUMENTS

2006/0114859 A1* 6/2006 Sudo ..................... H04W 48/16
370/335
2010/0150049 A1* 6/2010 Kim .................... H04W 76/022
370/312
(Continued)

FOREIGN PATENT DOCUMENTS

EP    2120371 A1    11/2009
JP    2000-183801 A    6/2000
(Continued)

OTHER PUBLICATIONS

International Search Report for corresponding International Application No. PCT/JP2013/063388, mailed Jun. 11, 2013 (1 page).
(Continued)

*Primary Examiner* — Myron K Wyche
(74) *Attorney, Agent, or Firm* — Osha Liang LLP

(57) ABSTRACT

To improve probability of successfully performing transmission processing by a priority terminal and transmission processing of an emergency call even during congestion. A mobile communication method according to the present invention includes the steps of: causing a radio base station eNB to transmit "UE Context Release Request" regarding a predetermined mobile station UE to a mobility management node MME, the "UE Context Release Request" containing identification information of multiple target mobile stations UE; causing the mobility management node MME to release an access bearer of the predetermined mobile station UE in response to the "UE Context Release Request", and transmit "UE Context Release Command" regarding the predetermined mobile station UE to the radio base station eNB, and causing the radio base station eNB to transmit "RRC Connection Release" to the plurality of target mobile stations UE.

18 Claims, 6 Drawing Sheets

(51) Int. Cl.
H04W 76/06 (2009.01)
H04W 92/12 (2009.01)

(52) U.S. Cl.
CPC ......... *H04W 76/06* (2013.01); *H04W 76/064* (2013.01); *H04W 76/066* (2013.01); *H04W 92/12* (2013.01); *Y02B 60/50* (2013.01)

(56) References Cited

U.S. PATENT DOCUMENTS

| | | | | |
|---|---|---|---|---|
| 2010/0248768 | A1* | 9/2010 | Nakatsugawa ... | H04W 52/0225 455/509 |
| 2013/0308541 | A1* | 11/2013 | Mao ............... | H04W 48/10 370/328 |
| 2014/0003348 | A1* | 1/2014 | Velev ............. | H04W 60/06 370/328 |
| 2014/0376480 | A1* | 12/2014 | Bergstrom ....... | H04W 48/20 370/329 |

FOREIGN PATENT DOCUMENTS

| | | | | |
|---|---|---|---|---|
| JP | 2009-182495 A | | 8/2009 | |
| WO | WO/2009/061242 | * | 5/2009 | ............. H04Q 7/38 |

OTHER PUBLICATIONS

Written Opinion for corresponding International Application No. PCT/JP2013/063388, mailed Jun. 11, 2013 (3 pages).

NTT DOCOMO, INC.; "Problem caused by DRX UE in congested network;" 3GPP TSG-RAN2#78, R2-122543; Prague, Czech; May 21-25, 2012 (3 pages).

3GPP TS 36.300 V11.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Mar. 2012 (194 pages).

3GPP TS 36.211 V10.4.0; "3rd Generation Partnership Project; Technical Specification Group Radio Access Network; Evolved Universal Terrestrial Radio Access (E-UTRA); Physical Channels and Modulation (Release 10);" Dec. 2011 (101 pages).

3GPP TS 36.213 V10.5.0; "3rd Generation Partnership Project; Technical Specification Group Radio Access Network; Evolved Universal Terrestrial Radio Access (E-UTRA); Physical Layer procedures (Release 10);" Mar. 2012 (125 pages).

3GPP TS 36.321 V11.2.0; "3rd Generation Partnership Project; Technical Specification Group Radio Access Network; Evolved Universal Terrestrial Radio Access (E-UTRA); Medium Access Control (MAC) protocol specification (Release 11);" Mar. 2013 (56 pages).

3GPP TS 36.331 V11.3.0; "3rd Generation Partnership Project; Technical Specification Group Radio Access Network; Evolved Universal Terrestrial Radio Access (E-UTRA); Radio Resource Control (RRC); Protocol specification (Release 11);" Mar. 2013 (344 pages).

Extended European Search Report issued Jan. 20, 2016, in corresponding European Patent Application No. 13790310.0 (12 pages).

3GPP TSG-RAN WG2 Meeting #75bis, R2-115193, Oct. 10-14, 2011, Zhuhai, China, "EAB mechanism for RAN overload control," (13 pages).

* cited by examiner

FIG. 3

UE CONTEXT RELEASE REQUEST

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| Cause | M | | 9.2.1.3 | | YES | ignore |
| GW Context Release Indication | O | | 9.2.1.84 | | YES | reject |
| UE Context to be Released List | | 1 | | | YES | reject |
| >UE Context to be Released Item IEs | | 0 to <maxnoofUE Contexts> | | | EACH | reject |
| >>MME UE S1AP ID | M | | 9.2.3.3 | | YES | reject |
| >>eNB UE S1AP ID | M | | 9.2.3.4 | | YES | reject |

| Range bound | Explanation |
|---|---|
| maxnoofUEContexts | Maximum no. of UE Contexts to be released, the maximum value is 256. |

FIG. 4

UE CONTEXT RELEASE COMPLETE

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| Criticality Diagnostics | O | | 9.2.1.21 | | YES | reject |
| UE Context to be Released List | | 1 | | | YES | reject |
| > UE Context to be Released Item IEs | | 0 to <*maxnoofUE Contexts*> | | | EACH | reject |
| >>MME UE S1AP ID | M | | 9.2.3.3 | | YES | reject |
| >>eNB UE S1AP ID | M | | 9.2.3.4 | | YES | reject |

| Range bound | Explanation |
|---|---|
| maxnoofUEContexts | Maximum no. of UE Contexts to be released, the maximum value is 256. |

FIG. 7

UE CONTEXT RELEASE COMMAND

| IE/Group Name | Presence | Range | IE type and reference | Semantics description | Criticality | Assigned Criticality |
|---|---|---|---|---|---|---|
| Message Type | M | | 9.2.1.1 | | YES | reject |
| CHOICE UE S1AP IDs | M | | | | YES | reject |
| >UE S1AP ID pair | M | | 9.2.3.18 | | | |
| >MME UE S1AP ID | M | | 9.2.3.3 | | | |
| Cause | M | | 9.2.1.3 | | YES | ignore |
| UE Context to be Released List | | 1 | | | YES | reject |
| >UE Context to be Released Item IEs | | 0 to <maxnoofUE Contexts> | | | EACH | reject |
| >>CHOICE UE S1AP IDs | M | | | | YES | reject |
| >>>UE S1AP ID pair | M | | 9.2.3.18 | | | |
| >>>MME UE S1AP ID | M | | 9.2.3.3 | | | |

| Range bound | Explanation |
|---|---|
| maxnoofUEContexts | Maximum no. of UE Contexts to be released, the maximum value is 256. |

MOBILE COMMUNICATION METHOD, RADIO BASE STATION AND MOBILITY MANAGEMENT NODE

TECHNICAL FIELD

The present invention relates to a mobile communication method, a radio base station and a mobility management node.

BACKGROUND ART

In a mobile communication system of the LTE (Long Term Evolution), transmission of "RA Preamble" in "RA (Random Access)" procedure for transmitting a signal relating to transmission processing (including location registration processing, this also applies hereinafter) such as, for example, location registration processing signaling (MO-signalling) and U-plane transmission processing signaling (MO-data) can be restricted by a mobile station UE in the RRC_IDLE state (idle state) by using a mechanism of ACB (Access Class Barring).

PRIOR ART DOCUMENTS

Non-Patent Documents

Non-patent Document 1: 3GPP TS36.300
Non-patent Document 2: 3GPP TS36.211
Non-patent Document 3: 3GPP TS36.213
Non-patent Document 4: 3GPP TS36.321
Non-patent Document 5: 3GPP TS36.331

SUMMARY OF THE INVENTION

However, in a mobile communication system of the conventional LTE, ACB cannot be performed on a transmission of "RA Preamble" in a RA procedure performed by a mobile station UE in "an RRC_CONNECTION" state (connected state) and a DRX (Discontinuous Reception) state (intermittent reception state) in response to "UL data arrival", in other words, the transmission of the "RA Preamble" cannot be restricted.

Accordingly, there are problems that "RA preamble" transmitted in a RA procedure for performing transmission processing by a priority terminal or transmission processing of an emergency call during congestion collides with the above-mentioned "RA Preamble" and thereby causes failure of the RA procedure, and may cause a delay or failure of the transmission processing.

Thus, the present invention has been made in view of such circumstances and has an objective of providing a mobile communication method, a radio base station and a mobility management node capable of improving the probability of successfully performing transmission processing by a priority terminal and transmission processing of an emergency call even during congestion.

A first feature of the present invention is summarized as a mobile communication method, including the steps of: causing a radio base station to determine multiple target mobile stations to be shifted from an intermittent reception state to an idle state; causing the radio base station to transmit a context release request signal regarding a predetermined mobile station to a mobility management node, the context release request signal containing identification information of multiple target mobile stations; causing the mobility management node to release an access bearer of the predetermined mobile station in response to the context release request signal, and transmit a context release command signal regarding the predetermined mobile station to the radio base station; and causing the radio base station to transmit a connection release signal to multiple target mobile stations.

A second feature of the present invention is summarized as a mobile communication method, including the steps of: causing a radio base station to determine multiple target mobile stations to be shifted from an intermittent reception state to an idle state; causing the radio base station to transmit a context release request signal regarding a predetermined mobile station to a mobility management node; causing the mobility management node to release an access bearer of the predetermined mobile station in response to the context release request signal, and transmit a context release command signal regarding the predetermined mobile station to the radio base station; causing the radio base station to transmit a connection release signal to multiple target mobile stations; and causing the radio base station to transmit a context release complete signal regarding the predetermined mobile station to the mobility management node, the context release complete signal containing identification information of multiple target mobile stations.

A third feature of the present invention is summarized as a mobile communication method, including the steps of: causing a mobility management node to determine multiple target mobile stations to be shifted from an intermittent reception state to an idle state; causing the mobility management node to transmit a context release command signal regarding a predetermined mobile station to a radio base station, the context release command signal containing identification information of multiple target mobile stations; and causing the radio base station to transmit a connection release signal to multiple target mobile stations in response to the context release command signal.

A fourth feature of the present invention is summarized as a radio base station including: a determination unit configured to determine multiple target mobile stations to be shifted from an intermittent reception state to an idle state; a transmission unit configured to transmit a context release request signal regarding a predetermined mobile station to a mobility management node, the context release request signal containing identification information of multiple target mobile stations; and a reception unit configured to receive a context release command signal regarding the predetermined mobile station from the mobility management node. Here, the transmission unit is configured to transmit a connection release signal to multiple target mobile stations.

A fifth feature of the present invention is summarized as a radio base station including: a determination unit configured to determine multiple target mobile stations to be shifted from an intermittent reception state to an idle state; a transmission unit configured to transmit a context release request signal regarding a predetermined mobile station to a mobility management node; and a reception unit configured to receive a context release command signal regarding the predetermined mobile station from the mobility management node. Here, the transmission unit is configured to transmit a connection release signal to multiple target mobile stations and then transmit a context release complete signal regarding the predetermined mobile station containing identification information of multiple target mobile stations.

A sixth feature of the present invention is summarized as a mobility management node including: a determination unit configured to determine multiple target mobile stations to be shifted from an intermittent reception state to an idle state; and a transmission unit configured to transmit a context release command signal regarding a predetermined mobile station to a radio base station, the context release command signal containing identification information of multiple target mobile stations.

BRIEF DESCRIPTION OF THE DRAWINGS

FIG. 3 is a diagram showing an example of a format of "UE Context Release Request" transmitted by the radio base station according to the first embodiment of the present invention.

FIG. 4 is a diagram showing an example of a format of "UE Context Release Complete" transmitted by the radio base station according to the first embodiment of the present invention.

FIG. 7 is a sequence diagram for illustrating the operation of the mobile communication system according to the second embodiment of the present invention.

DETAILED DESCRIPTION (Mobile communication system according to the first embodiment of the present invention)

The mobile communication system according to the first embodiment of the present invention is described with reference to FIGS. 1 to 5.

Figure 1:
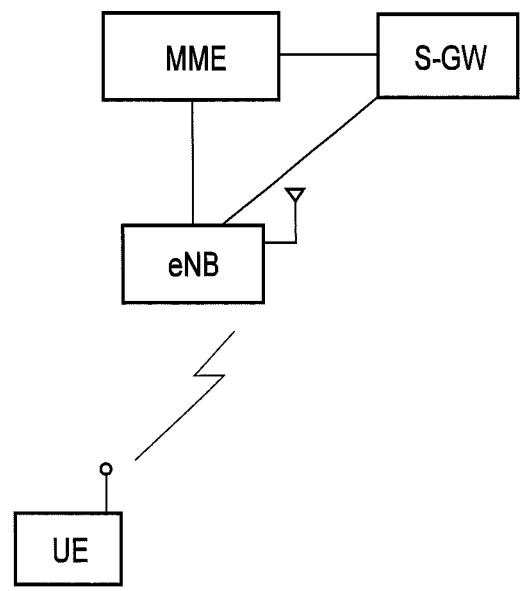
FIG. 1 is an overall configuration diagram of a mobile communication system according to a first embodiment of the present invention.

The mobile communication system according to this embodiment supports the LTE scheme, and includes, as shown in FIG. 1, a gateway apparatus S-GW (Serving-Gateway), a mobility management node MME (Mobility Management Entity), a radio base station eNB, and a mobile station UE.

Here, the mobility management node MME and the radio base station eNB are connected to each other via an S1 interface.

Figure 2:
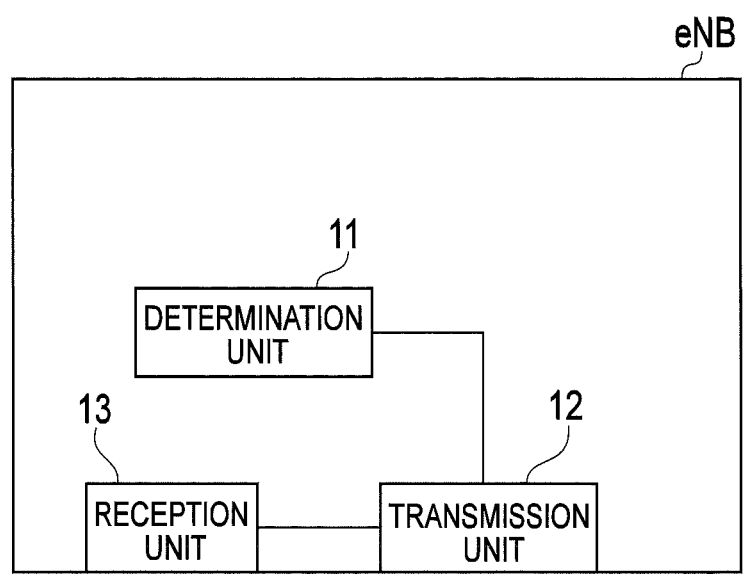
FIG. 2 is a functional block diagram of a radio base station according to the first embodiment of the present invention.

As shown in FIG. 2, the radio base station eNB according to this embodiment includes a determination unit 11, a transmission unit 12, and a reception unit 13.

The determination unit 11 is configured to determine a plurality of target mobile stations UE to be shifted from the DRX state to the RRC_IDLE state.

That is, the determination unit 11 is configured to determine, as the plurality of target mobile stations UE, a plurality of mobile stations UE whose transmission of "RA Preamble" is to be restricted, out of the mobile stations UE in the DRX state.

The transmission unit 12 is configured to transmit various signals to the mobile station UE, the mobility management node MME, and the gateway apparatus S-GW. The reception unit 13 is configured to receive various signals from the mobile station UE, the mobility management node MME, and the gateway apparatus S-GW.

For example, the transmission unit 12 may be configured to transmit "UE Context Release Request" regarding a predetermined mobile station UE to the mobility management node MME, the "UE Context Release Request" containing identification information of multiple target mobile stations UE.

Specifically, as shown in FIG. 3, the transmission unit 12 is configured to notify identification information of multiple target mobile stations UE by using an information element "UE Context to be Released List" within "UE Context Release Request".

Here, information elements "MME UE S1AP ID" and "eNB UE S1AP ID" within "UE Context Release Request" shown in FIG. 3 indicate the above predetermined mobile station UE.

Alternatively, the transmission unit 12 may be configured to transmit "UE Context Release Complete" regarding a predetermined mobile station UE to the mobility management node MME, the "UE Context Release Complete" containing identification information of multiple target mobile stations UE.

Specifically, as shown in FIG. 4, the transmission unit 12 is configured to notify identification information of multiple target mobile stations UE by using the information element "UE Context to be Released List" within "UE Context Release Complete".

Here, information elements "MME UE S1AP ID" and "eNB UE S1AP ID" within "UE Context Release Complete" shown in FIG. 4 indicate the above predetermined mobile station UE.

Further, the transmission unit 12 is configured to transmit "RRC Connection Release" to multiple target mobile stations UE.

When the reception unit 13 receives "UE Context Release Command" regarding a predetermined mobile station UE from the mobility management node ME, the transmission unit 12 may be configured to transmit "RRC Connection Release" to multiple target mobile stations UE.

Hereinafter, the operation of the mobile communication system according to this embodiment is described with reference to FIG. 5.

Figure 5:
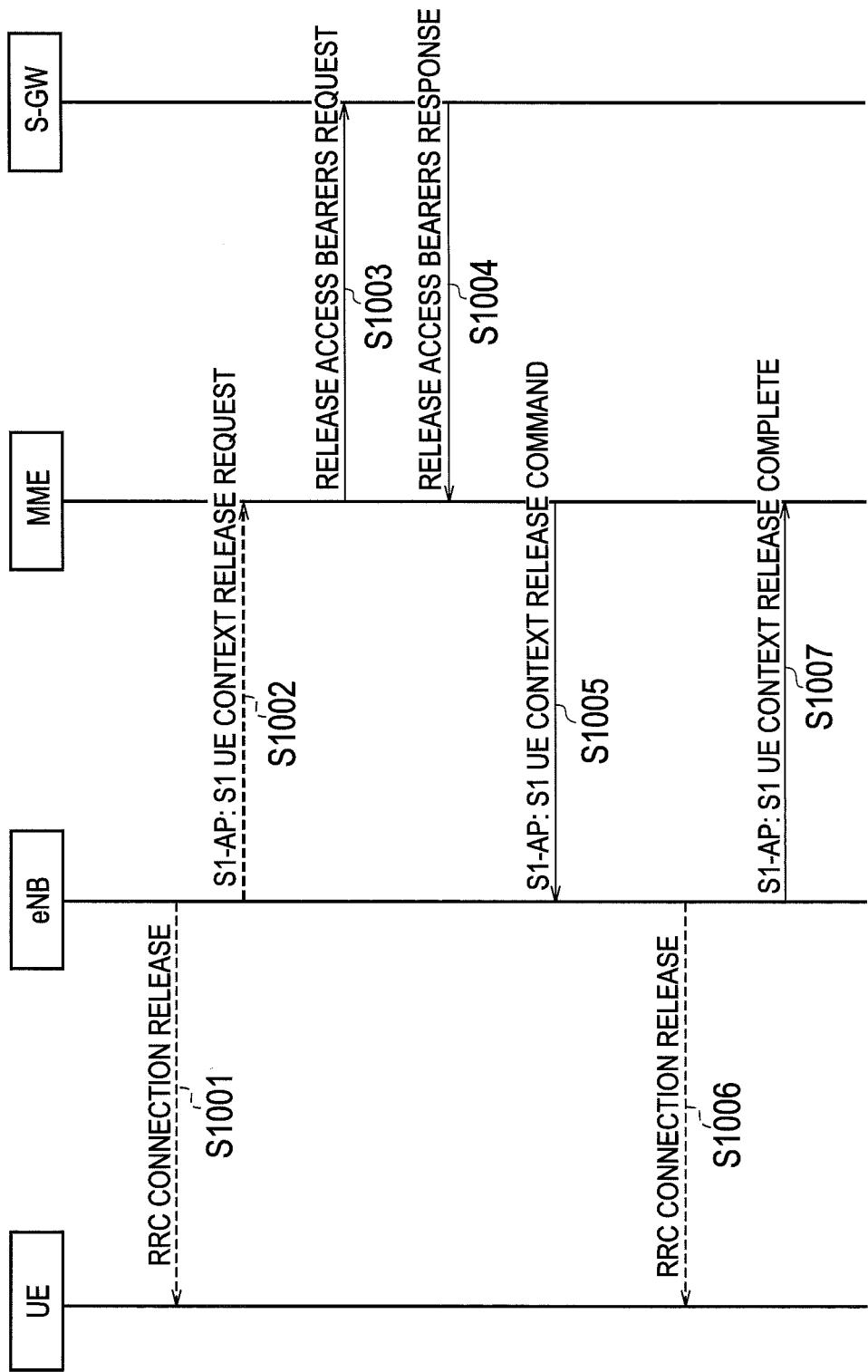
FIG. 5 is a sequence diagram for illustrating the operation of the mobile communication system according to the first embodiment of the present invention.

As shown in FIG. 5, after determining multiple target mobile stations UE to be shifted from the DRX state to the RRC_IDLE state, the radio base station eNB transmits "RRC Connection Release" to multiple of target mobile stations UE at Step S1001 or S1006.

At Step S1002, the radio base station eNB transmits "UE Context Release Request" regarding the predetermined mobile station UE to the mobility management node MME.

Here, the radio base station eNB may notify the mobility management node MME of identification information of multiple target mobile stations UE by transmitting "UE Context Release Request" regarding the predetermined mobile station UE.

At Step S1003, the mobility management node MME transmits "Release Access Bearers Request" to the gateway apparatus S-GW, and at Step S1004, the gateway apparatus S-GW transmits "Release Access Bearers Response" to the mobility management node MME to release an access bearer of the predetermined mobile station UE.

At Step S1005, the mobility management node MME transmits "UE Context Release Command" regarding the predetermined mobile station UE to the radio base station eNB.

Upon completion of releasing the RRC connection of multiple target mobile stations UE, the radio base station eNB transmits "UE Context Release Complete" regarding the predetermined mobile station UE to the mobility management node MME at Step S1007.

Here, the radio base station eNB may notify the mobility management node MME of identification information of multiple target mobile stations UE by transmitting "UE Context Release Complete" regarding the predetermined mobile station UE.

According to an aspect of this embodiment, transmission of "RA Preamble" by multiple target mobile stations UE can be restricted during congestion by shifting multiple target mobile stations UE from the DRX state to the RRC_IDLE state at the initiative of the radio base station eNB, and thereby, the probability of successfully performing transmission processing by a priority terminal and transmission processing of an emergency call can be improved.

Further, according to an aspect of this embodiment, signaling on the S1 interface necessary for shifting multiple target mobile stations UE from the DRX state to the RRC_IDLE state can be reduced, and thereby the signaling load in the mobility management node MME can be mitigated.

(Mobile communication system according to the second embodiment of the present invention)

Hereinafter, with reference to FIGS. 5 to 7, the mobile communication system according to the second embodiment of the present invention is described by focusing on differences thereof from the mobile communication system according to the first embodiment described above.

Figure 6:
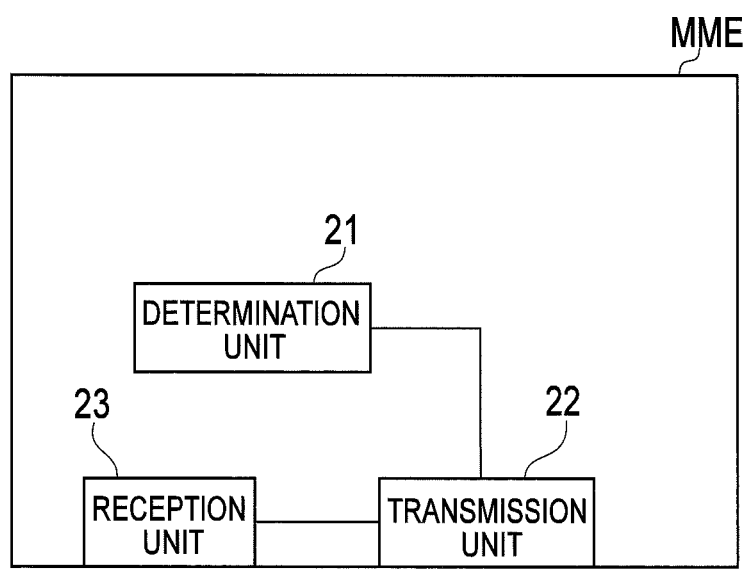
FIG. 6 is a functional block diagram of a mobility management node according to a second embodiment of the present invention.

As shown in FIG. 6, the mobility management node MME according to this embodiment includes a determination unit 21, a transmission unit 22, and a reception unit 23.

The determination unit 21 is configured to determine multiple target mobile stations UE to be shifted from the DRX state to the RRC_IDLE state.

That is, the determination unit 21 is configured to determine, as multiple target mobile stations UE, multiple mobile stations UE whose transmission of "RA Preamble" is to be restricted, out of the mobile stations UE in the DRX state.

The transmission unit 22 is configured to transmit various signals to the radio base station eNB and the gateway apparatus S-GW. The reception unit 23 is configured to receive various signals from the radio base station eNB and the gateway apparatus S-GW.

For example, the transmission unit 22 may be configured to transmit "UE Context Release Command" regarding a predetermined mobile station UE to the radio base station eNB, the "UE Context Release Command" containing identification information of multiple target mobile stations UE.

Specifically, as shown in FIG. 7, the transmission unit 12 is configured to notify identification information of multiple target mobile stations UE by using the information element "UE Context to be Released List" within "UE Context Release Command".

Here, the information element "UE S1AP IDs" within "UE Context Release Command" shown in FIG. 7 indicates the above predetermined mobile station UE.

Hereinafter, the operation of the mobile communication system according to this embodiment is described with reference to FIG. 5.

As shown in FIG. 5, after determining multiple target mobile stations UE to be shifted from the DRX state to the RRC_IDLE state, the mobility management node MME transmits "Release Access Bearers Request" to the gateway apparatus S-GW at Step S1003, and at Step S1004, the mobility management node MME receives "Release Access Bearers Response" from the gateway apparatus S-GW to release an access bearer of the predetermined mobile station UE.

At Step S1005, the mobility management node MME transmits "UE Context Release Command" regarding the predetermined mobile station UE to the radio base station eNB.

Here, the mobility management node MME may notify the radio base station eNB of identification information of multiple target mobile stations UE by transmitting "UE Context Release Complete" regarding the predetermined mobile station UE.

At Step S1006, the radio base station eNB transmits "RRC Connection Release" to multiple target mobile stations UE.

Upon completion of releasing the RRC connection of the target mobile station UE, the radio base station eNB transmits "UE Context Release Complete" regarding the predetermined mobile station UE to the mobility management node MME at Step S1007.

According to an aspect of this embodiment, transmission of "RA Preamble" by multiple target mobile stations UE can be restricted during congestion by shifting multiple target mobile stations UE from the DRX state to the RRC_IDLE state at the initiative of the mobility management node MME, and thereby the probability of successful transmission processing by a priority terminal and transmission processing of an emergency call can be improved.

(Modification 1)

Determination units 11 and 21 may be configured not to select priority terminals of special Access Classes (ACs) that comprise Access Classes 11-15 (AC11-15) as multiple target mobile stations UE to be shifted from the DRX state to the RRC_IDLE state.

Determination units 11 and 21 may determine whether or not the mobile station UE is a priority terminal, according to "highPriorityAccess" in an information element "establishment cause" within "RRC Connection Request" or "Initial UE Message".

The features of the present invention may also be expressed as follows.

A first feature of this embodiment is summarized as a mobile communication method, including the steps of: causing a radio base station eNB to determine multiple target mobile stations UE to be shifted from a DRX (an intermittent reception) state to an RRC_IDLE state (an idle state); causing the radio base station eNB to transmit "UE Context Release Request (a context release request signal)" regarding a predetermined mobile station UE to a mobility management node MME, "UE Context Release Request" containing identification information of multiple of target mobile stations UE; causing the mobility management node MME to release an access bearer of the predetermined mobile station UE in response to "UE Context Release Request", and transmit "UE Context Release Command (a context release command signal)" regarding the predetermined mobile station UE to the radio base station eNB; and causing the radio base station eNB to transmit "RRC Connection Release (a connection release signal)" to multiple target mobile stations UE.

A second feature of this embodiment is summarized as a mobile communication method, including the steps of: causing a radio base station eNB to determine multiple target mobile stations UE to be shifted from a DRX state to an RRC_IDLE state; causing the radio base station eNB to transmit "UE Context Release Request" regarding a predetermined mobile station UE to a mobility management node MME; causing the mobility management node MME to release an access bearer of the predetermined mobile station UE in response to "UE Context Release Request", and transmit "UE Context Release Command" regarding the predetermined mobile station UE to the radio base station eNB; causing the radio base station eNB to transmit "RRC Connection Release" to multiple target mobile stations UE; and causing the radio base station eNB to transmit "UE Context Release Complete (a context release complete signal)" regarding the predetermined mobile station UE to the mobility management node MME, "Context Release Complete" containing identification information of multiple target mobile stations UE.

A third feature of this embodiment is summarized as a mobile communication method, including the steps of: causing a mobility management node MME to determine multiple target mobile stations UE to be shifted from a DRX state to an RRC_IDLE; causing the mobility management node MME to transmit "UE Context Release Command" regarding a predetermined mobile station UE to a radio base station eNB, "UE Context Release Command" containing identification information of multiple target mobile stations UE; and causing the radio base station eNB to transmit "RRC Connection Release" to multiple target mobile stations UE in response to "UE Context Release Command."

A fourth feature of this embodiment is summarized as a radio base station eNB including: a determination unit 11 configured to determine multiple target mobile stations UE to be shifted from a DRX state to an RRC_IDLE state; a transmission unit 12 configured to transmit "UE Context Release Request" regarding a predetermined mobile station UE to a mobility management node MME, "UE Context Release Request" containing identification information of multiple target mobile stations UE; and a reception unit 13 configured to receive "UE Context Release Command" regarding the predetermined mobile station UE from the mobility management node MME. Here, the transmission unit 12 is configured to transmit "RRC Connection Release" to multiple target mobile stations UE.

A fifth feature of this embodiment is summarized as a radio base station eNB including: a determination unit 11 configured to determine multiple target mobile stations UE to be shifted from a DRX state to an RRC_IDLE state; a transmission unit 12 configured to transmit "UE Context Release Request" regarding a predetermined mobile station UE to a mobility management node MME; and a reception unit 13 configured to receive "UE Context Release Command" regarding the predetermined mobile station from the mobility management node MME. Here, the transmission unit 12 is configured to transmit "RRC Connection Release" to multiple target mobile stations UE and then transmit "UE Context Release Complete" regarding the predetermined mobile station UE containing identification information of multiple target mobile stations.

A sixth feature of this embodiment is summarized as a mobility management node MME including: a determination unit 21 configured to determine multiple target mobile stations UE to be shifted from a DRX state to an RRC_IDLE state; and a transmission unit 22 configured to transmit "UE Context Release Command" regarding a predetermined mobile station UE to a radio base station eNB, "UE Context Release Command" containing identification information of multiple target mobile stations UE.

It should be noted that the foregoing operations of the mobile station UE, the radio base station eNB and the mobility management node MME may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE, the radio base station eNB and the mobility management node MME. Otherwise, the storage medium and the processor may be provided as discrete components inside the mobile station UE, the radio base station eNB and the mobility management node MME.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-110900 (filed on May 14, 2012) is incorporated by reference in the present specification.

INDUSTRIAL APPLICABILITY

As described above, an aspect of the present invention provides a mobile communication method, a radio base station, and a mobility management node capable of improving the probability of successfully performing transmission processing by a priority terminal and transmission processing of an emergency call even during congestion.

EXPLANATION OF THE REFERENCE NUMERALS

UE mobile station
eNB radio base station
MME mobility management node
11, 21 determination unit
12, 22 transmission unit
13, 23 reception unit

The invention claimed is:
1. A mobile communication method, comprising the steps of:
 causing a radio base station to determine a plurality of target mobile stations whose transmission of a random access (RA) preamble is to be restricted by shifting from a Discontinuous Reception (DRX) state in a Radio Resource Control (RRC) CONNECTION state to an RRC IDLE state;
 causing the radio base station to transmit a context release request signal regarding a predetermined mobile station to a mobility management node, the context release request signal containing identification information of the plurality of target mobile stations;

causing the mobility management node to release an access bearer of the predetermined mobile station in response to the context release request signal, and transmit a context release command signal regarding the predetermined mobile station to the radio base station; and causing the radio base station to transmit a connection release signal to the plurality of target mobile stations, wherein the plurality of target mobile stations in the DRX state in the RRC CONNECTION state transmits the RA preamble in an RA procedure to perform transmission processing and transmission of the RA preamble by the plurality of target mobile stations in the DRX state in the RRC CONNECTION state is not restricted by Access Class Barring (ACB), and wherein the transmission of the RA preamble by the plurality of target mobile stations in the RRC IDLE state is restricted by ACB.

2. A mobile communication method, comprising the steps of:

causing a radio base station to determine a plurality of target mobile stations whose transmission of a random access (RA) preamble is to be restricted by shifting from a Discontinuous Reception (DRX) state in a Radio Resource Control (RRC) CONNECTION state to an RRC IDLE state;

causing the radio base station to transmit a context release request signal regarding a predetermined mobile station to a mobility management node;

causing the mobility management node to release an access bearer of the predetermined mobile station in response to the context release request signal, and transmit a context release command signal regarding the predetermined mobile station to the radio base station;

causing the radio base station to transmit a connection release signal to the plurality of target mobile stations; and causing the radio base station to transmit a context release complete signal regarding the predetermined mobile station to the mobility management node, the context release complete signal containing identification information of the plurality of target mobile stations, wherein the plurality of target mobile stations in the DRX state in the RRC CONNECTION state transmits the RA preamble in an RA procedure to perform transmission processing and transmission of the RA preamble by the plurality of target mobile stations in the DRX state in the RRC CONNECTION state is not restricted by Access Class Barring (ACB), and wherein the transmission of the RA preamble by the plurality of target mobile stations in the RRC IDLE state is restricted by ACB.

3. A mobile communication method, comprising the steps of:

causing a mobility management node to determine a plurality of target mobile stations whose transmission of a random access (RA) preamble is to be restricted by shifting from a Discontinuous Reception (DRX) state in a Radio Resource Control (RRC) CONNECTION state to an RRC IDLE state;

causing the mobility management node to transmit a context release command signal regarding a predetermined mobile station to a radio base station, the context release command signal containing identification information of the plurality of target mobile stations; and causing the radio base station to transmit a connection release signal to the plurality of target mobile stations in response to the context release command signal, wherein the plurality of target mobile stations in the DRX state in the RRC CONNECTION state transmits the RA preamble in an RA procedure to perform transmission processing and transmission of the RA preamble by the plurality of target mobile stations in the DRX state in the RRC CONNECTION state is not restricted by Access Class Barring (ACB), and wherein the transmission of the RA preamble by the plurality of target mobile stations in the RRC IDLE state is restricted by ACB.

4. A radio base station comprising:

a determination unit configured to determine a plurality of target mobile stations whose transmission of a random access (RA) preamble is to be restricted by shifting from a Discontinuous Reception (DRX) state in a Radio Resource Control (RRC) CONNECTION state to an RRC IDLE state;

a transmission unit configured to transmit a context release request signal regarding a predetermined mobile station to a mobility management node, the context release request signal containing identification information of the plurality of target mobile stations; and a reception unit configured to receive a context release command signal regarding the predetermined mobile station from the mobility management node, wherein the transmission unit is configured to transmit a connection release signal to the plurality of target mobile stations, wherein the plurality of target mobile stations in the DRX state in the RRC CONNECTION state transmits the RA preamble in an RA procedure to perform transmission processing and transmission of the RA preamble by the plurality of target mobile stations in the DRX state in the RRC CONNECTION state is not restricted by Access Class Barring (ACB), and wherein the transmission of the RA preamble by the plurality of target mobile stations in the RRC IDLE state is restricted by ACB.

5. A radio base station comprising:

a determination unit configured to determine a plurality of target mobile stations whose transmission of a random access (RA) preamble is to be restricted by shifting from a Discontinuous Reception (DRX) state in a Radio Resource Control (RRC) CONNECTION state to an RRC IDLE state;

a transmission unit configured to transmit a context release request signal regarding a predetermined mobile station to a mobility management node; and a reception unit configured to receive a context release command signal regarding the predetermined mobile station from the mobility management node, wherein the transmission unit is configured to transmit a connection release signal to the plurality of target mobile stations and then transmit a context release complete signal regarding the predetermined mobile station containing identification information of the plurality of target mobile stations, wherein the plurality of target mobile stations in the RRC CONNECTION state transmits the RA preamble in an RA procedure to perform transmission processing and transmission of the RA preamble by the plurality of target mobile stations in the DRX state in the RRC CONNECTION state is not restricted by Access Class Barring (ACB), and wherein the transmission of the RA preamble by the plurality of target mobile stations in the RRC IDLE state is restricted by ACB.

6. A mobility management node comprising:

a determination unit configured to determine a plurality of target mobile stations whose transmission of a random access (RA) preamble is to be restricted by shifting from a Discontinuous Reception (DRX) state in a Radio Resource Control (RRC) CONNECTION to an RRC IDLE state; and a transmission unit configured to transmit a context release command signal regarding a predetermined mobile station to a radio base station, the context release command signal containing identification information of the plurality of target mobile stations, wherein the plurality of target mobile stations in the DRX state in the RRC CONNECTION state transmits the RA preamble in an RA procedure to perform transmission processing and transmission of the RA preamble by the plurality of target mobile stations in the DRX state in the RRC CONNECTION state is not restricted by Access Class Barring (ACB), and wherein the transmission of the RA preamble by the plurality of target mobile stations in the RRC IDLE state is restricted by ACB.

7. The mobile communication method according to claim 1, wherein the radio base station selects the plurality of target mobile stations from among mobile stations except priority terminals of special Access Classes, and wherein the special Access Classes comprise Access Classes 11-15.

8. The mobile communication method according to claim 2, wherein the radio base station selects the plurality of target mobile stations from among mobile stations except priority terminals of special Access Classes, and wherein the special Access Classes comprise Access Classes 11-15.

9. The mobile communication method according to claim 3, wherein the mobility management node selects the plurality of target mobile stations from among mobile stations except priority terminals of special Access Classes, and wherein the special Access Classes comprise Access Classes 11-15.

10. The radio base station according to claim 4, wherein the radio base station selects the plurality of target mobile stations from among mobile stations except priority terminals of special Access Classes, and wherein the special Access Classes comprise Access Classes 11-15.

11. The radio base station according to claim 5, wherein the radio base station selects the plurality of target mobile stations from among mobile stations except priority terminals of special Access Classes, and wherein the special Access Classes comprise Access Classes 11-15.

12. The mobility management node according to claim 6, wherein the radio base station selects the plurality of target mobile stations from among mobile stations except priority terminals of special Access Classes, and wherein the special Access Classes comprise Access Classes 11-15.

13. The mobile communication method according to claim 1, wherein the plurality of target mobile stations whose transmission of the RA preamble is to be restricted are mobile stations except for priority terminals and mobile stations performing transmission processing of an emergency call.

14. The mobile communication method according to claim 2, wherein the plurality of target mobile stations whose transmission of the RA preamble is to be restricted are mobile stations except for priority terminals and mobile stations performing transmission processing of an emergency call.

15. The mobile communication method according to claim 3, wherein the plurality of target mobile stations whose transmission of the RA preamble is to be restricted are mobile stations except for priority terminals and mobile stations performing transmission processing of an emergency call.

16. The mobile communication method according to claim 4, wherein the plurality of target mobile stations whose transmission of the RA preamble is to be restricted are mobile stations except for priority terminals and mobile stations performing transmission processing of an emergency call.

17. The mobile communication method according to claim 5, wherein the plurality of target mobile stations whose transmission of the RA preamble is to be restricted are mobile stations except for priority terminals and mobile stations performing transmission processing of an emergency call.

18. The mobile communication method according to claim 6, wherein the plurality of target mobile stations whose transmission of the RA preamble is to be restricted are mobile stations except for priority terminals and mobile stations performing transmission processing of an emergency call.

* * * * *